United States Patent
Kakio et al.

(10) Patent No.: US 9,982,785 B2
(45) Date of Patent: May 29, 2018

(54) PRESSURE CONTROL VALVE AND CONTROL VALVE

(71) Applicant: SHIMADZU CORPORATION, Nishinokyo-Kuwabaracho Nakagyo-Ku, Kyoyto-Shi Kyoto (JP)

(72) Inventors: Masafumi Kakio, Kyoto (JP); Junya Kuromusha, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days. days.

(21) Appl. No.: 14/764,018

(22) PCT Filed: Feb. 5, 2013

(86) PCT No.: PCT/JP2013/052541
§ 371 (c)(1),
(2) Date: Jul. 28, 2015

(87) PCT Pub. No.: WO2014/122720
PCT Pub. Date: Aug. 14, 2014

(65) Prior Publication Data
US 2015/0362081 A1 Dec. 17, 2015

(51) Int. Cl.
*F16K 1/52* (2006.01)
*F16K 31/12* (2006.01)
(Continued)

(52) U.S. Cl.
CPC .............. *F16K 1/52* (2013.01); *F15B 13/024* (2013.01); *F16K 17/02* (2013.01);
(Continued)

(58) Field of Classification Search
CPC . F16K 1/52; F16K 31/12; F16K 17/02; F16K 17/105; F16K 17/0433; F16K 47/02; F15B 13/024; Y10T 137/7793
(Continued)

(56) References Cited

U.S. PATENT DOCUMENTS 4,870,989 A * 10/1989 Bickford ............... F16K 17/105
137/489
4,892,118 A * 1/1990 Davis ..................... F01D 17/145
137/625.3
(Continued)

FOREIGN PATENT DOCUMENTS

JP U1988125264 8/1988
JP U1992004575 1/1992
(Continued)

OTHER PUBLICATIONS

PCT/JP2013/052541, Search Report, dated May 14, 2013, 2 pages—English, 2 pages—Japanese.
(Continued)

*Primary Examiner* — Mary McManmon
*Assistant Examiner* — Patrick Williams
(74) *Attorney, Agent, or Firm* — Andrew F. Young, Esq.; Lackenbach Siegel, LLP

(57) ABSTRACT

A pressure control valve includes a main valve unit provided with a main valve element and a valve housing body having a main valve seat capable of seating the main valve element and having a pilot chamber for slidably housing the main valve element. A pilot valve unit is provided with a pilot valve element and a pilot valve seat member has a pilot valve seat capable of seating the pilot valve element and separating the pilot valve element from the pilot valve seat and opening when a pressure in the pilot chamber exceeds a predetermined pressure. The pressure control valve is configured with recessed (concaved) parts that form hydraulic fluid channels between the pilot valve seat member and the pilot valve element when the pilot valve unit is in an open-valve-state at three or more locations so as to be separated by equal angles. Each recess has the same shape.

2 Claims, 5 Drawing Sheets

(51) Int. Cl.
*F16K 17/02* (2006.01)
*F16B 13/02* (2006.01)
*F16K 17/10* (2006.01)
*F16K 17/04* (2006.01)
*F16K 47/02* (2006.01)
*F15B 13/02* (2006.01)

(52) U.S. Cl.
CPC ........ *F16K 17/0433* (2013.01); *F16K 17/105* (2013.01); *F16K 31/12* (2013.01); *F16K 47/02* (2013.01); *Y10T 137/7793* (2015.04)

(58) Field of Classification Search
USPC ............ 137/596.2, 625.3; 251/333, 359, 126
See application file for complete search history.

(56) References Cited

U.S. PATENT DOCUMENTS

| | | | | | |
|---|---|---|---|---|---|
| 5,037,277 | A | * | 8/1991 | Tan | ..................... F04B 53/1087 137/540 |
| 5,842,501 | A | * | 12/1998 | Powell | .................. F16K 17/105 137/489 |
| 6,588,725 | B1 | * | 7/2003 | Wisnieski | ................ B67D 1/12 251/123 |
| 6,666,433 | B1 | * | 12/2003 | Pierce | .................... F16K 25/00 251/123 |
| 7,832,653 | B2 | * | 11/2010 | Yukimoto | ............... F16K 47/04 236/92 B |
| 2009/0194174 | A1 | * | 8/2009 | Morgan | .................. F16K 1/385 137/469 |
| 2012/0216897 | A1 | * | 8/2012 | Kaegi | ....................... F15C 1/16 137/808 |
| 2014/0190578 | A1 | * | 7/2014 | Hayashi | ................ F16K 31/007 137/486 |

FOREIGN PATENT DOCUMENTS

| | | |
|---|---|---|
| JP | H05263954 | 10/1993 |
| JP | H11311349 | 11/1999 |

OTHER PUBLICATIONS

Microfilm of the specification and drawings annexed to the request of Japanese Utility Model Appln. No. 45549/1990 (Laid open No. 4575/1992), Toshiba Automation Co., Ltd.) Jan. 16, 1992 (Jan. 16, 1992), entire text; all drawings, Certificate of Translation.

Microfilm of the specification and drawings annexed to the request of Japanese Utility Model Appln. No. 16923/1987 (Laid-open No. 125264/1988), (Kubota Tekko Kabushiki Kaisha), Aug. 16, 1988 (Aug. 16, 1988), entire test; all drawings, Certificate of Translation.

* cited by examiner

PRIOR ART

PRESSURE CONTROL VALVE AND CONTROL VALVE

CROSS REFERENCE TO RELATED APPLICATIONS

This application relates to and claims priority from JPCT/JP2013/052541 filed Feb. 5, 2013, the entire contents of which are incorporated herein by reference.

FIGURE SELECTED FOR PUBLICATION

FIG. 2

BACKGROUND OF THE INVENTION

Field of the Invention

The present invention relates to a pressure control valve applied in the fluid pressure circuit used in an industrial vehicle and a control valve system including a pressure control valve as a constituent element.

Description of the Related Art

Conventionally, referring now to FIG. 5 and as set forth below, a balance piston type valve is known as a pressure control valve and is used in a fluid pressure circuit used for industrial vehicles. This type of pressure control valve V is installed between an input port a1c receiving an operation fluid and a tank port a1d continuously connected to a tank for storing operation fluid and valve V comprises a main valve element a6 and a valve seat a7a in which the main valve element a6 can seat and also a main valve unit a4 formed by utilizing a valve storage body a7 having a pilot chamber a7b in which the main valve element a6 is slidably stored, the pilot valve element a8, and a pilot valve unit a5 formed by utilizing a pilot valve seat member a9 having a pilot valve seat a9a in which the pilot valve element a8 can seat and fixedly installed in the main valve unit a4. Both the main valve element a6 and the pilot valve element a8 are biased by a biasing means a101, a102 (such as a spring) to seat respectively in the main valve seat a7a and the pilot valve seat a9a. Then, when both the main valve unit a4 and the pilot valve unit a5 are in the closed valve state, fluid pressure inside the input port a1c is operative to the pilot valve element a8 through the inside of the pilot chamber a7a.

Then, when the inside pressure of the input port a1c becomes higher than the predetermined pressure, fluid pressure operative to the pilot valve element a8 is stronger than the biasing force by the biasing means a102 and the pilot valve element a8 separates from the pilot valve seat a9a and the pilot valve unit a5 will be in the open valve state. Then, as the inside of pilot chamber a7b continuously connects to the tank port aid, the differential pressure between the inside of input port a1c and the inside of pilot chamber a7b is generated and the force due to the differential pressure is stronger than the biasing force by the biasing means a101 so that the main valve element a6 leaves from the main valve seat a7a and the main valve unit a4 will also be in the open valve state.

Accordingly, while the pilot valve unit a5 is in the open valve state and the main valve unit a4 is in the closed valve state, operation fluid flows through the gap between the pilot valve seat a9a and the pilot valve element a8 of the pilot valve seat member a9, but unfortunately the central axis of the pilot valve seat a9a and the central axis of the pilot valve element a8 may not be always coaxial and also the back-and-forth direction of the pilot valve element a8 may not be the same as the extending direction of the central axis of the pilot valve element a5. Therefore, in the case of these situations the pilot valve element a8 is eccentric relative to the pilot valve seat a9a and operation fluid flows through the gap, the problem takes place, wherein as a result the pilot valve element a8 can vibrate due to the fluid pressure of fluid and collides with the pilot valve seat member a9 to make abnormal noise, causing premature wear, leakage and other defects.

One construction in an effort to solve such problems is disclosed in which a guide to keep slidably the pilot valve element is installed to make the back-and-forth direction of the pilot valve element as the same as the extending direction of the central axis of the pilot valve element (e.g., Patent Document 1, the entire contents of which are incorporated by reference).

However, unfortunately according to the constitution disclosed in Patent Document 1, since the guide member must be additionally installed and modified, the number of parts and assembly processes increase so that an increase of the production cost can be raised as another problem.

PRIOR ART DOCUMENTS

Patent Document 1: JP Patent Published H11-311349

ASPECTS AND SUMMARY OF THE INVENTION

Problems to be Solved by the Invention

The purpose of the present invention, focusing on the above points, is to prevent or suppress an occurrence of the defect making an abnormal noise without increasing the number of parts and assembly processes, which takes place when the pilot valve unit is in the open valve state and the pilot valve element vibrates because of receiving fluid pressure and collides with the pilot valve seat member.

Means for Solving the Problem

A pressure control valve of the present invention has the following construction. Specifically, the pressure control valve of the present invention is the pressure control valve including: a main valve element and a main valve seat in which the main valve element can seat and also a main valve unit including a valve storage body having a pilot chamber in which the main valve element is slidably stored; a pilot valve seat member including a pilot valve element and a pilot valve seat in which the pilot valve element can seat; and a pilot valve unit that will open as the pilot valve element separates from the pilot valve seat when the pressure of the inside of the pilot chamber becomes higher than the predetermined pressure of the spring urging force, wherein a concave part forming the flow passage for the operation fluid in between the pilot valve element when said pilot valve unit is in the open valve state is separated from each other with the same angle and formed at more than three places in the pilot valve seat member, and also each concave part has the identical shape.

Further, the control valve of the present invention includes at least a casing in which an input port receiving the operation fluid and an open tank port continuously connecting to an external storage tank (not shown), and the control valve installed between the input port and the tank port inside the casing.

Accordingly, during a use the present invention pilot valve element receives the fluid pressure from the operation fluid flowing through each flow passage but a perpendicular component, relative to the back-and-forth direction of the composition of fluid pressures from the operation fluid flowing through each flow passage, is erased because each adjacent flow passage separates (or estranges) with the same relative angle and each concave part has the identical shape. As a result, a member guides the back-and-forth direction of the pilot valve element installed so that the defect making an abnormal noises is prevented or suppressed without increasing the number of parts and assembly processes, which takes place when the pilot valve element takes the open valve position, and also prevents the pilot valve element vibrating because of receiving the fluid pressure that collides with the pilot valve seat member.

Effects of the Invention

According to the present invention and construction thereof, the occurrence of the defect making an abnormal noise is prevented or suppressed without increasing the number of parts and assembly processes, which takes place when the pilot valve unit is open, and it is now recognized that the pilot valve element vibrates because of receiving fluid pressure and in response collides with the pilot valve seat member.

According to the present invention, a pressure control valve includes a main valve unit provided with a main valve element and a valve housing body having a main valve seat capable of seating the main valve element and having a pilot chamber for slidably housing the main valve element. A pilot valve unit is provided with a pilot valve element and a pilot valve seat member has a pilot valve seat capable of seating the pilot valve element and separating the pilot valve element from the pilot valve seat and opening when a pressure in the pilot chamber exceeds a predetermined pressure. The pressure control valve is configured with recessed parts that form hydraulic fluid channels between the pilot valve seat member and the pilot valve element when the pilot valve unit is in an open state at three or more locations so as to be separated by equal angles. Each of the recessed parts has the same shape.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
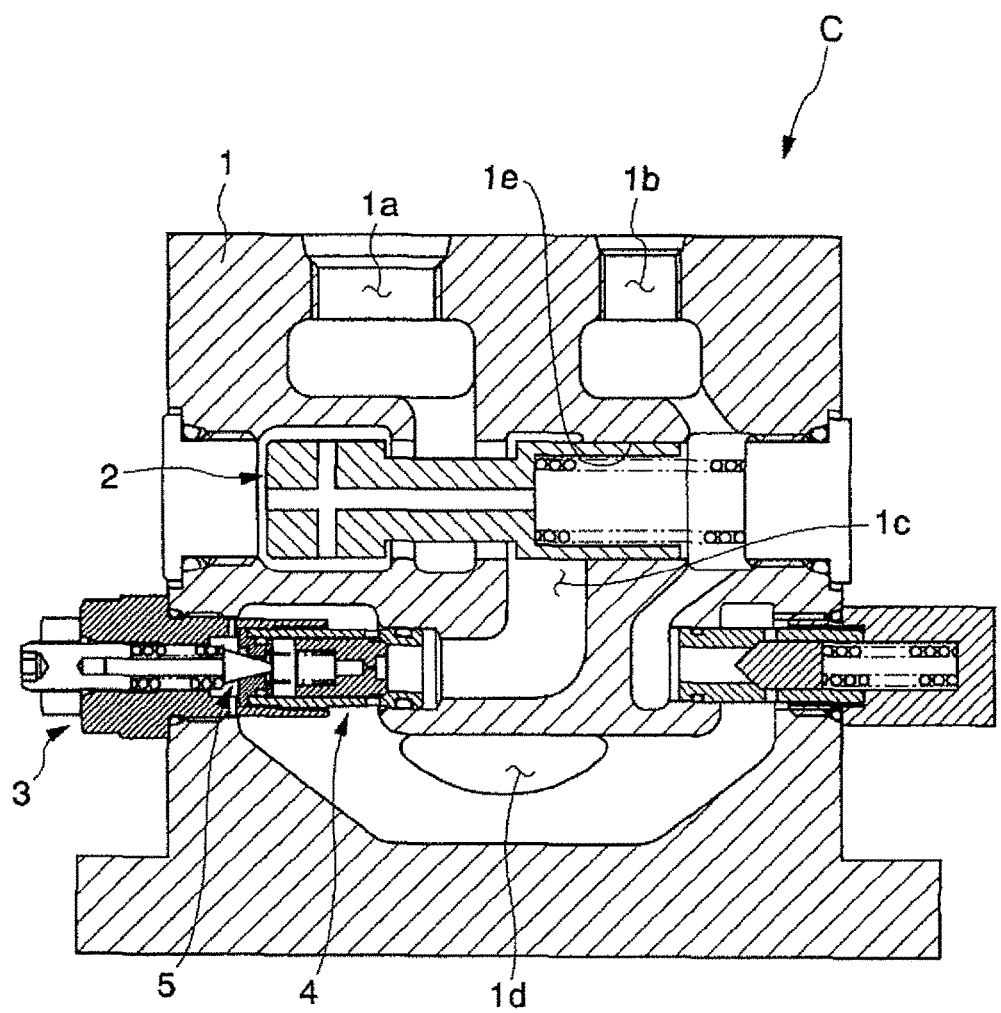
FIG. 1 is a schematic diagram illustrating a control valve of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Hereafter, the inventor sets forth the first Embodiment of the present invention referring FIG. 1-FIG. 4.

Referring to FIG. 1, the control valve C of the present invention is used in a fluid pressure system applied for the industrial vehicles and includes at least a casing 1, a flow dividing valve 2 mountable to the casing 1, and a pressure control valve 3 operably mountable to casing 1. A pressured oil input port 1a operates as an input port receiving an operation fluid (fluid not shown), a steering passage 1b is provided to operably discharge the operation fluid to the fluid pressure system, not shown in FIG., to control the steering of a vehicle (not shown) during a use. A loading and unloading passage 1c is provided to discharge the operation fluid to the fluid pressure system (complete system not shown), to control a loading and unloading equipment of a vehicle. A low pressure passage 1d is positioned as the tank port continuously connecting to the tank (not shown) to store the operation fluid in an operable manner in casing 1. Flow dividing valve 2 is installed inside a flow dividing valve storage hole 1e continuously connected to pressured oil input port 1a, steering passage 1b and loading and unloading passage 1c is operative to inlet a part of the operation fluid input from pressured oil input port 1a via the continuous passage installed in the inside thereof to the steering passage 1b and also to inlet the remaining operation fluid input from the pressured oil input port 1a by operably changing the opening level corresponding to an inside pressure of the pressured oil input port 1a to the loading and unloading passage 1c.

Pressure control valve 3, installed between the loading and unloading passage 1c and the low pressure passage 1d, includes a main valve unit 4 and a pilot valve unit 5, as shown.

Here, as will be understood from study of the provided disclosure, the operation fluid input from pressured oil input port 1a to control valve C, as set forth above, is divided into steering passage 1b and loading and unloading passage 1c via flow dividing valve 2 during a use thereof. Accordingly, when, during a use, the fluid pressure of the operation fluid divided into the loading and unloading passage 1c becomes higher than the permitted predetermined pressure; firstly the pilot valve unit 5 of the pressure control valve 3 will open and then the main valve unit 4 will open. At that time, upon such opening, the operation fluid flows out from the loading and unloading passage 1c to the low pressure passage 1d.

Specifically, the pressure control valve 3 functions to control the pressure inside the loading and unloading passage 1c so as to not be higher than the predetermined pressure (e.g., a release pressure).

Hereafter, the inventor sets forth the specific constitution of the pressure control valve 3.

Figure 2:
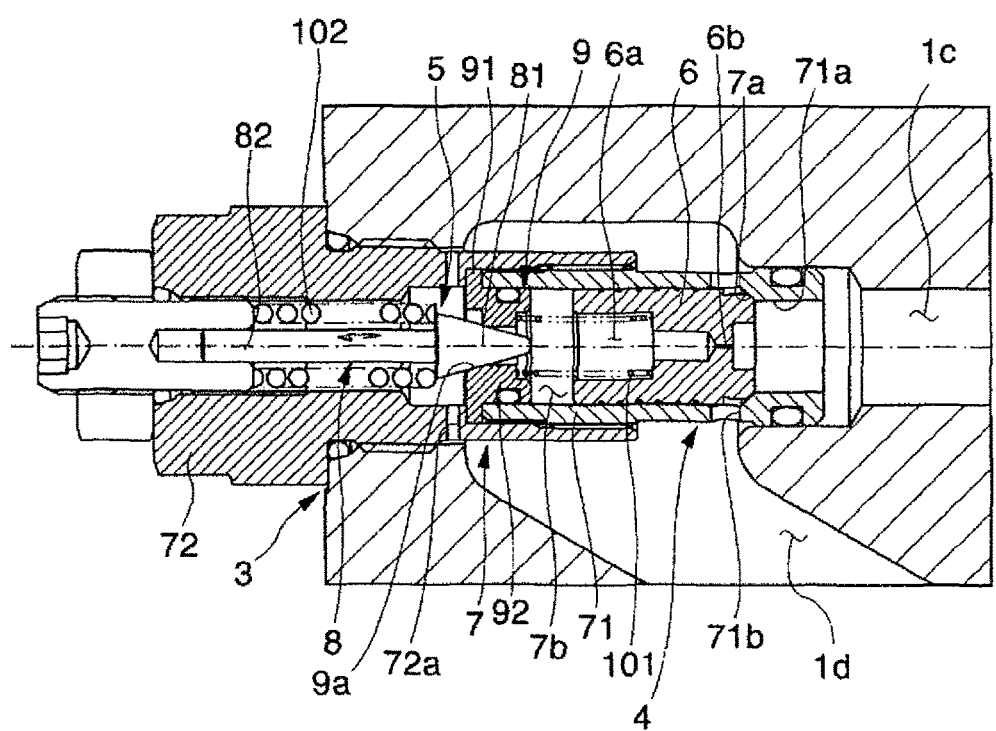
FIG. 2 is a schematic diagram illustrating a pressure control valve of the invention.

Referring additionally to FIG. 2, pressure control valve 3 includes a main valve element 6 and a main valve seat 7a in which main valve element 6 can seat during a use, and also a main valve unit a4 formed by utilizing a valve storage body 7 having a pilot chamber 7b in which the main valve element 6 is slidably stored, a pilot valve element 8, and a pilot valve unit 5 formed by utilizing a pilot valve seat member 9 having a pilot valve seat 9a in which the pilot valve element 8 can seat fixedly installed in the main valve unit 4 during a use. Further, as set forth above, the pressure control valve 3 is installed between the loading and unloading passage 1c and the low pressure passage 1d, by which during a use when the pilot valve unit 5 and the main valve unit 4 are open, the loading and unloading passage 1c and the low pressure passage 1d are continuously connected and in other cases, in-between of the loading and unloading passage 1c and the low pressure passage 1d is blocked.

Main valve unit 4 is formed by utilizing the main valve element 6 and the valve storage body 7 having the main valve seat 7a in which the main valve element 6 can seat. The main valve element 6 that is a bottomed cylindrical member having internal space 6a open in the opposite direction to the direction toward the main valve seat 7a comprises an orifice continuously connecting the internal space 6a and the loading and unloading passage 1c. On the other hand, the valve storage body 7 comprises the first sleeve 71 arranged in the side of the loading and unloading passage 1c and the second sleeve 72 which stores a part of first sleeve 71 in the one end and of which the other end is mounted to casing 1. First sleeve 71 is the cylindrical member having the operation fluid input port 71a continuously connecting to the loading and unloading passage 1c at the end of the side toward loading and unloading passage c and also having a first operation fluid discharge port 71b continuously connecting to the low pressure passage 1d in the side surface and is formed as pilot chamber 7b inside which the main valve element 6 is slidable. Main valve seat 7a is formed at the upstream side edge of pilot chamber 7b. Second sleeve 72 is connected to the opposite side edge of the operation fluid input port 71a of the first sleeve 71 with a screw (not shown, or other connection mechanism) and stores the pilot valve element 8 of the pilot valve unit 5 in the inside thereof. Second sleeve 72 includes the second operation fluid discharge port 72a continuously connecting the internal space and low pressure passage 1d. During a use, main valve unit 4 selects either a closed-valve-state in which main valve element 6 seats in main valve seat 7a or the open-valve-state in which main valve element 6 separates (estranges) from main valve seat 7a. Further specifically, a spring 101 is operative as a biasing mechanism or means and in use biases main valve element 6 toward main valve seat 7a between the bottom of the internal space 6a of main valve element 6 and the bottom of pilot valve seat member 9; and when a differential pressure between the inside of the pilot chamber 7b and the loading and unloading passage 1c takes place because the pilot valve unit 5 is in the open-valve-state, the operative force due to the differential pressure for main valve element 6 is stronger than the biasing force of spring 101 and main valve unit 4 will advance and move to the open-valve-state.

As set forth above and referring to FIG. 2, the pilot valve unit 5 is formed by utilizing pilot valve element 8 that is movable back-and-forth in the inside of second sleeve 72 of valve storage body 7 of main valve unit 4; and, pilot valve seat member 9 having pilot valve seat 9a in the inside thereof in which pilot valve element 8 can seat, and fixedly installed in between first sleeve 71 of valve storage body 7 of main valve unit 4 and second sleeve 72.

Pilot valve element 8 includes valve element main body 81 having approximately conical shape in which the diameter thereof is getting smaller in the direction toward loading and unloading passage c (as shown) and guide unit 82 extends to the opposite direction away from loading and unloading passage 1c and slides and moves inside second sleeve 72.

On the other hand, referring additionally to FIG. 3, pilot valve seat member 9 includes a flange part 91 installed between first sleeve 71 and second sleeve 72, a mounting part 92 extending from flange part 91 to loading and unloading passage 1a and installed inside sleeve 71, and pilot valve seat 9a at the end of the opposite direction to the direction toward the loading and unloading passage 1c. During a use, pilot valve unit 5 selects either the closed-valve-state in which pilot valve element 8 seats in main valve seat 9a or the open-valve-state in which pilot valve element 8 estranges from main valve seat 7a.

Further specifically, a spring 102 is operable as a biasing mechanism or means and is operable to bias pilot valve element 8 toward pilot valve seat 9a and is installed between a rear anchor of guide 82 and second sleeve 72 (as noted in FIG. 2), and when the fluid pressure induced from loading and unloading passage 1c into the inside of pilot chamber 7b via an orifice 6b of the main valve element is higher than the predetermined pressure (from the spring force of spring 102), the operative force due to the fluid pressure for pilot valve element 8 is stronger than the biasing force of the spring 102 and pilot valve unit 5 will be in the open-valve-state.

As noted directly in FIG. 3, a plurality of concave parts 9x are formed in the flow passage along seat 9a for the operation fluid in between pilot valve element 8, when pilot valve element 8 is in the open-valve-state (is separated) and formed at three and more places in pilot valve seat member 9 each with the same angle. All concave parts 9x have the identical shape and the bottomed ditch drilled toward outside of pilot valve seat 9a. Further, each concave part 9x has an approximately arc shape in the rear view thereof. In addition, the shape of each concave part 9x can be set as any shape that is operative for the function of concave parts 9x as discussed herein.

Figure 4:
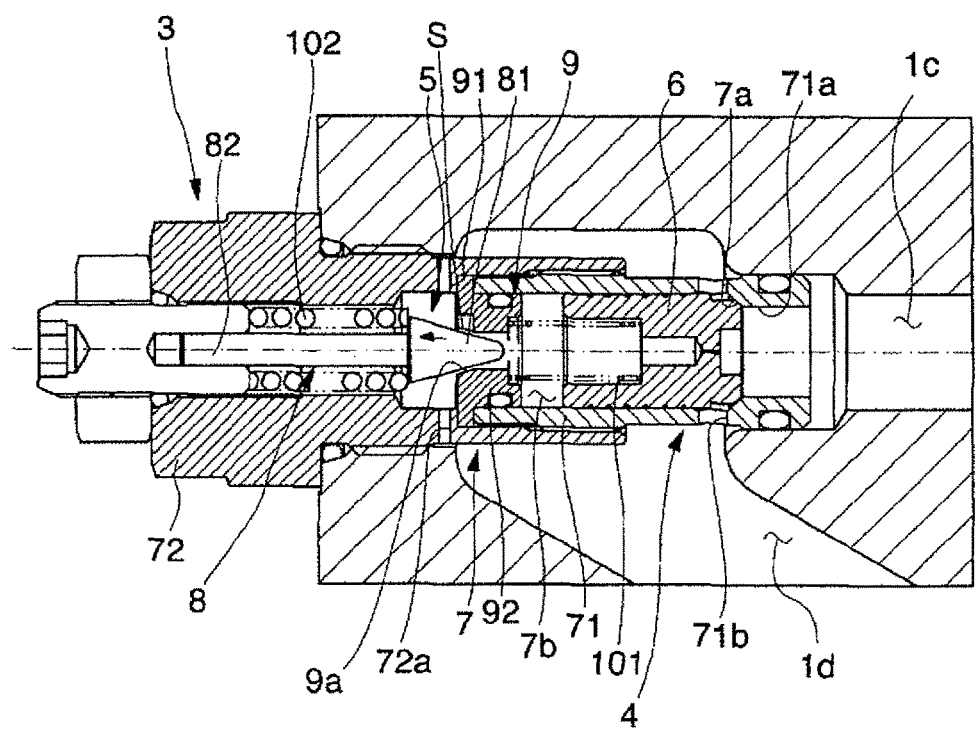
FIG. 4 is an explanatory drawing illustrating the behavior of the pressure control valve of the present invention in a movement position.
Figure 5:
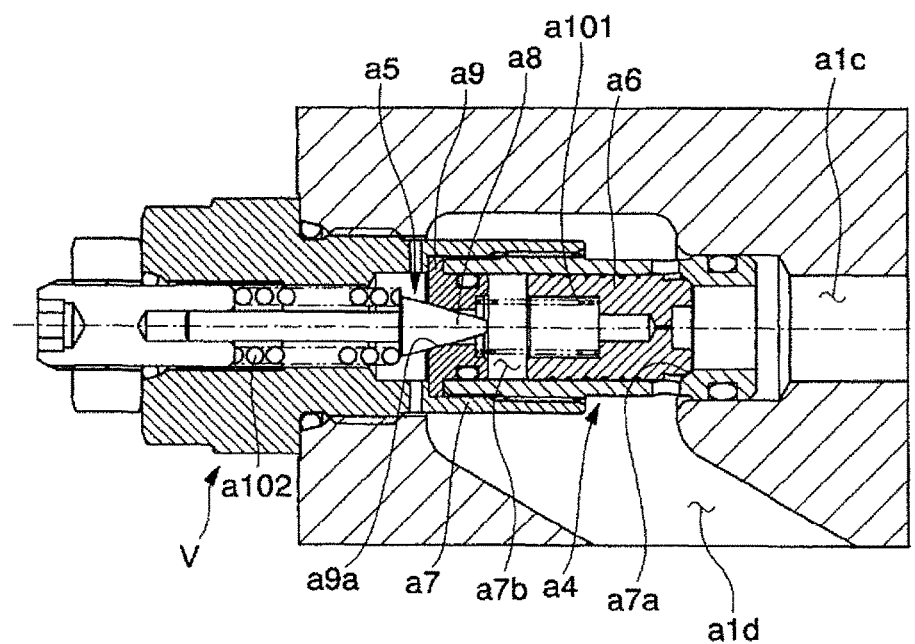
FIG. 5 is a schematic diagram illustrating a conventional pressure control.

Then, during further operation when the fluid pressure inside the loading and unloading passage 1c is higher than the predetermine pressure, firstly, the force due to the fluid pressure operative to the pilot valve element 8 becomes stronger than the biasing force operative to the pilot valve element 8 (by spring 102); and pilot valve element 8 leaves from pilot valve seat 9a and pilot valve unit 5 will be in the open-valve-state referring to FIG. 4. At this time, a gap S is generated between pilot valve element 8 and pilot valve seat member 9. The width of gap S where concave parts 9x is installed is larger than other parts and consequently the operation fluid flows mainly inside concave part 9x. Then, the force due to the fluid pressure of the operation fluid flowing inside the concave part 9x and operative to the pilot valve element 8 has a component in the leaving direction from pilot valve seat 9a along with the center of axis of pilot valve element 8 and in the direction toward the center of axis of pilot valve element 8. However, the concave parts 9x are estranged (separated) from each other with the same angle and all of them have the identical shape so that all components of the force due to the fluid pressure of the operation fluid and operative to pilot valve element 8 in the direction toward the center of axis have the same severity and the forces are therefore compensated and erased each other. Accordingly, when pilot valve element 8 is in the open-valve-state, the force due to flow of the operation fluid has only the component in the aligned leaving direction from pilot valve seat 9a along with the center of axis of pilot valve element 8. Then, the operation fluid inside pilot chamber 7b is discharged to low pressure passage 1d via second operation fluid discharge port 72a and the differential pressure between loading and unloading passage 1d and pilot chamber 7b so that the force due to the differential pressure can be stronger than the biasing force of spring 101 operative to main valve element 6 leaves (separates) from main valve seat 7a and then main valve unit 4 will be in the open-valve-state.

Figures 3A, 3B:
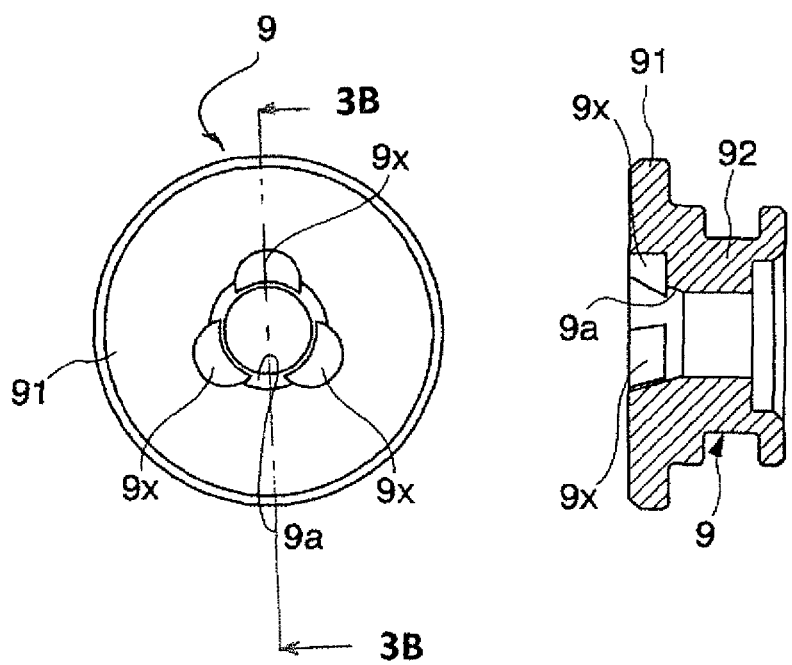
FIG. 3A is a front view illustrating a control valve seat member of the invention.
FIG. 3B is a cross-sectional side view along line 3B-3B in FIG. 3A.

Specifically, according to the present invention, it will be understood that concave parts 9x having identical shape are estranged (separated) from each other with the same angle, in the same shape, and are installed at the equally spaced three places in pilot valve seat member 9 (as shown in FIG. 3A), and when pilot valve element 8 is in the open-valve-state, the operation fluid flows between concave parts 9x and pilot valve element 8 so that the force due to flow of the operation fluid, as set forth above, has only the force component in the leaving (separation) direction from pilot valve seat 9a along the center of axis of pilot valve element 8. Accordingly, the present invention prevents an occurrence of a defect making an abnormal noise occurring when a conventional pilot valve element 8 in the open-valve-state and vibration because of receiving fluid vector pressures colliding with the pilot valve seat member 9 are prevented without increasing the number of parts and assembly processes.

Further, according to the present Embodiment, concave parts 9x are installed at the three places (in the preferred embodiment) so that a minimum number of processes can bring the realization of the constitution of pilot valve seat member 9, by which the above effects can be obtained, and also pilot valve element 8 can be pressed along the same axis mechanically and most stably by the operation fluid flowing inside the concave part 9x.

Further, it will be understood that the present invention is not limited to the embodiment discussed above. For example, the concave part portions (shown as 9x) installed in the pilot valve seat member is not limited to the three places (as shown) and may be installed at more than four places so that the effective impact of the fluid forces also provide co-axial affects and produce no vibration or noise. Also, the present concepts may not only be applied as the constituent element of the control valve used in the industrial vehicles, but also the pressure control valve relative to the present invention may be applied alone as a relief valve opened when the high pressure port fluid pressure in e.g., the fluid pressure circuit is higher than the predetermined fluid pressure.

Further the present invention can be modified within the scope and spirit of the present disclosure in a variety of aspects unless otherwise departing from the spirit of the present invention.

INDUSTRIAL APPLICABILITY

The present invention provides industrial applicability since the proposed invention minimizes the abnormal noises and vibration that take place because the present inventive system addresses the vibration caused by the receiving fluid pressure collides with the pilot valve seat, and minimizes the impact thereof without increasing the number of parts and assembly processes.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

EXPLANATION OF REFERENCES

C Control valve
1 Casing
3 Pressure control valve
4 Main valve unit
5 Pilot valve unit
6 Main valve element
7 Valve storage body
8 Pilot valve element
9 Pilot valve seat member
9x Concave parts

What is claimed is:

1. A pressure control valve, comprising:
   a main valve element being received at least partially within and co-axially aligned with respect to a main valve seat when in a closed state;
   a main valve unit operatively utilizing a valve storage body and having a pilot chamber operably receiving said main valve element;
   a pilot valve element including a pilot valve main body having a substantially conical shape having a diameter that tapers toward a distal end thereof; and a pilot valve seat member having a pilot valve seat which seats said pilot valve element, the diameter of the pilot valve main body permitting only partial insertion of the pilot valve element with respect to the pilot valve seat in the closed state;
   wherein during a use said pilot valve element operably separates from said pilot valve seat and opens when a pressure inside said pilot chamber becomes higher than a predetermined pressure determined by a biasing mechanism,
   further comprising: at least three operative concave parts formed on said pilot valve seat member and in a fluid flow passage proximate said pilot valve element when said pilot valve unit is in an open valve state, wherein an operation fluid is configured to flow between said concave parts and said pilot valve element such that pressure against said pilot valve member is minimized and wherein, in the closed state, the distal end of the pilot valve main body passes between and beyond the concave parts; and each said concave part equally spaced from each other on said pilot valve seat member and each having a respective uniform arcuate shape on said pilot valve seat member.

2. A pressure control valve system, according to claim 1, comprising;
   a casing in which an input port is operative to receive an operation fluid and an open tank port operatively connected an external storage tank; and said pressure control valve, according to claim 1, operatively installed between said input port and said tank port in a flow connection therewith.

\* \* \* \* \*